(12) United States Patent
Nauck et al.

(10) Patent No.: US 7,289,857 B2
(45) Date of Patent: Oct. 30, 2007

(54) DATA ANALYSIS SYSTEM AND METHOD

(75) Inventors: Detlef D Nauck, Ipswich (GB);
Behnam Azvine, Ipswich (GB); Martin Spott, Ipswich (GB)

(73) Assignee: British Telecommunications public limited company, London (GB)

( * ) Notice: Subject to any disclaimer, the term of this patent is extended or adjusted under 35 U.S.C. 154(b) by 35 days.

(21) Appl. No.: 10/550,791

(22) PCT Filed: Mar. 12, 2004

(86) PCT No.: PCT/GB2004/001070

§ 371 (c)(1),
(2), (4) Date: Sep. 22, 2005

(87) PCT Pub. No.: WO2004/088443

PCT Pub. Date: Oct. 14, 2004

(65) Prior Publication Data

US 2006/0195201 A1 Aug. 31, 2006

(30) Foreign Application Priority Data

Mar. 31, 2003 (GB) .................... 0307406.9

(51) Int. Cl.
*G05B 13/02* (2006.01)
*G06F 15/18* (2006.01)
*G06F 15/00* (2006.01)
*A61B 5/00* (2006.01)
(52) U.S. Cl. .................. 700/30; 702/185; 706/900; 600/300

(58) Field of Classification Search .................. 700/30; 702/185; 706/900
See application file for complete search history.

(56) References Cited

U.S. PATENT DOCUMENTS 4,634,946 A * 1/1987 Moulds et al. ............... 318/561
5,067,099 A * 11/1991 McCown et al. ........... 702/183
5,210,704 A 5/1993 Husseiny (Continued)

FOREIGN PATENT DOCUMENTS

EP 0 411 869 2/1991

OTHER PUBLICATIONS

United Kingdom Search Report p. 1, Aug. 2003.

(Continued)

*Primary Examiner*—Anthony Knight
*Assistant Examiner*—Thomas Stevens
(74) *Attorney, Agent, or Firm*—Nixon & Vanderhye P.C.

(57) ABSTRACT

Data from a monitoring system is analyzed for monitoring characteristics of a dynamic system. Characteristic data in respect of a dynamic system is monitored and provided with at least one known normal state. Characteristic data is received from a monitoring system and confirmation information from an operator when the dynamic system is in a known normal state. A normality model is derived including comprising data indicative of known normal states in response to received characteristic data and confirmation information. Future characteristic data is predicted from the normality model a difference function is provided indicating an acceptable difference between predicted and received characteristic data. Predicted characteristic data is compared with received characteristic data in conjunction with the difference function and an abnormality signal is produced if the difference exceeds the difference function.

11 Claims, 15 Drawing Sheets

U.S. PATENT DOCUMENTS

| | | |
|---|---|---|
| 5,265,131 A | 11/1993 | Scarola et al. |
| 5,566,092 A | 10/1996 | Wang et al. |
| 5,890,142 A * | 3/1999 | Tanimura et al. ............. 706/12 |
| 6,125,311 A | 9/2000 | Lo |
| 6,327,550 B1 | 12/2001 | Vinberg et al. |
| 6,330,484 B1 * | 12/2001 | Qin ............................ 700/50 |
| 6,370,437 B1 * | 4/2002 | Carter et al. .................. 700/52 |
| 6,545,836 B1 * | 4/2003 | Ioannou et al. .......... 360/77.06 |

OTHER PUBLICATIONS

PCT International Search Report, Aug. 31, 2004 p. 1-3.

Michels, Dr. Kai, "HISS—A New Approach for Intelligent Supervision", Proceedings of the Joint 9th IFSA World Congress and 20th NAFIPS International Conference (Vancouver, Jul. 25-28), IEEE Piscataway, 2001, pp. 1110-1115.

* cited by examiner

Step 1 – Incoming signature from sensor (time domain)

Step 2 – Filtered signature (time domain)

Subtracting a signature from a reference signature

Thresholds for Error Signals

DATA ANALYSIS SYSTEM AND METHOD

BACKGROUND

This application is the US national phase of international application PCT/GB2004/001070 filed 12 Mar. 2004 which designated the U.S. and claims benefit of GB 0307406.9, dated 31 Mar. 2003, the entire content of which is hereby incorporated by reference.

1. Technical Field

The present invention relates to systems and methods for the analysis of data from a monitoring system for monitoring a dynamic system.

2. Related Art

Diagnosing abnormal behaviour of a system (e.g. a technical system, environmental conditions, vital signs, etc) is similar to a physician's diagnosis based on observing symptoms of a patient. Medical doctors are capable of interpreting symptoms and making a diagnosis based on data obtained from observing a patient. Even if the observed symptoms are not sufficient to determine the cause of an illness, medical doctors can often determine that a symptom or measurement is not normal because they know from experience what is normal in a patient and what is not.

In order to replicate such an intelligent diagnosis process in an automated Condition Monitoring System (CMS), the CMS must know "what is normal" and "what is not normal". Known CMSs use signatures to achieve that goal. A signature is a limited amount of data that represents a certain feature of the environment that is monitored by a sensor. A signature, for example, can be as simple as a temperature value or as complex as the Fourier transform of a current observed over a certain time. A diagnosis based on signature analysis can be realised by the following steps:

1. Signature acquisition
2. Comparison of an incoming signature with reference signatures.
3. Deciding if the incoming signature is normal or abnormal.
4. Interpreting the signature in order to make a proper diagnosis.

CMSs usually comprise steps 1-3, while step 4 generally involves the intervention of a domain expert after an alarm has been raised by a CMS.

Most of the incoming signatures are usually tainted with noise, which makes their recognition difficult. Therefore, in addition to all available classified signatures (reference signatures) the signature database must also contain tolerance levels for each signature. Tolerance levels are required to avoid false alarms. The information from the signature database is used to classify sensor data into three different states. If the system recognises the incoming signature as a class member of its database it can be directly classified as either normal or abnormal, and raise an alarm if the signature is considered to be abnormal. If the system does not recognise the incoming signature to be within the tolerance level of any reference signature, then it will be considered as unknown and possibly abnormal. In this case the system will also raise an alarm. Based on the signature that caused an alarm to be raised, a domain expert will be able make a diagnosis and determine if the signature actually indicates an abnormal state, and if intervention is required.

Detecting Abnormal Conditions in Sensor Data

In order to detect abnormal states in any environment automatically, the use of sensors is required. There are many different types of sensors, which can have different degrees of reliability. For example, in a refinery the use of chemical sensors can detect gas leakage, whereas in a power station electrical sensors may be used to detect dangerously high voltage. Some common types of sensor include mechanical sensors, temperature sensors, magnetic and electro-magnetic field sensors, laser sensors, infrared sensors, ultraviolet sensors, radiation sensors and acoustic sensors.

Sensor data is in general observed in the time domain and the frequency domain. Amplitude, mean, range, interference noise and standard deviation are commonly used functions for analytical analysis of sensor data. They can be analysed individually or combined in a multi-dimensional approach.

When a sensor system is designed, several factors influence the choice of sensors, for example, linearity, resolution, spectral pass band, accuracy, response time, signal noise ratio, etc. All these factors have also to be taken into consideration for the specification of threshold and tolerance levels. FIGS. 1 to 4 illustrate an example of a condition monitoring process that comprises obtaining a signature from a sensor, pre-processing it and applying a transformation for finally classifying the signature.

Simple CMSs detect abnormal conditions by comparing the incoming sensor data against thresholds, which are usually statistically characteristic values like mean, standard deviation, minimum, maximum, etc (see FIG. 5).

A more complex detection mechanism compares incoming signatures against reference signatures. The comparison can be computed by different techniques depending on the complexity of the problem. A simple example is to subtract the incoming signature from a reference signature stored in a database. The difference between the two signals is called the error and the amplitude of this error will define if the two signals are close or not. The mean square error can also be computed for getting a better estimation of this error. FIG. 6 illustrates this approach.

A simple way of determining if an error signal indicates an abnormal condition is to use thresholds. A more complex evaluation of an error signal would be based on the computation of several characteristics of the error signal, which are than compared against threshold values. Threshold values for evaluating error signals have to be carefully chosen in order to maximise the precision of the detection. FIG. 7 illustrates how the levels of upper and lower thresholds may be chosen in order to allow an alarm to be triggered when a signal outside a "normal" range occurs. The precision will depend on the choice of these levels as well as on the quality of the sensors used and the quality of the data acquisition system.

Known condition monitoring systems use condition libraries against which sensor data is matched. For example, the article "HISS—A new approach to intelligent supervision" (Kai Michels, Proceedings of the Joint $9^{th}$ IFSA World Congress and $20^{th}$ NAFIPS International Conference (Vancouver, 25-28 July), IEEE Piscataway, 2001 (ISBN: 0-78037079-1), pp. 1110-1115) provides a solution for detecting leaks in gas pipelines by using audio sensors. The sound recorded by an audio sensor is matched against a library of sounds indicating leakage and sounds indicating normal environmental sounds. If a sound recorded by the sensor is closer to a sound indicating leakage than to a normal sound the monitoring software raises an alarm. Further, it is possible to use artificial intelligence technology to carry out pattern recognition and decide what conditions should raise alarms in order to monitor the state of a system. An example of this is disclosed in U.S. Pat. No. 6,327,550 (Vinberg et al), which relates to a method and apparatus for such state monitoring whereby a system is educated, during an initial "learning phase", to identify recognisable "common modes" of a monitored system, which are clusters of commonly occurring states of that system. During a later "monitoring phase" the state monitoring system continuously monitors the system by comparing state vectors of the system with the recognised common modes previously identified by pattern recognition during the learning period, and raises an alarm whenever a state vector appears that does not lie within one of the recognised common modes. Also during the monitoring phase the system is able to update its degree of learning in the following manner. A human manager or automated management tool may study alarm messages, and even inspect the managed system, and if it is determined that an alarm message was raised in respect of a common situation that should be included among the common modes for future monitoring, the system is able to add the relevant new state to the existing set of common modes.

Prior art U.S. Pat. No. 5,890,142 relates to an apparatus for monitoring system condition, the apparatus including a predicting section which is said to generate a data vector whose parameter is said to be determined by timeseries data of the system and which is said to obtain a prediction value of the timeseries data of a predetermined time future by means of chaotic inference based on the behaviour of an attractor generated in a reconstruction space by an embedding operation of the data vector. The system appears then to make short-term predictions based on an assumption that the behaviour of the system is chaotic, and judge whether the observed system is in a normal or an abnormal condition.

It will be evident that condition monitoring in known systems can generally only be usefully applied if normal and abnormal conditions of the monitored system are known and can be specified. That means CMSs are not suitable for use in ill-defined domains or domains where abnormal conditions have not been observed before, are not likely to be observed and cannot be created or predicted easily. An example would be the failure of an expensive piece of machinery. It is very desirable to predict failure well in advance in order to schedule maintenance in time. Failure may be devastating such that it is not possible to drive the monitored machine into failure mode in order to record failure conditions. There may be only vague and uncertain knowledge about thresholds of monitored signals and this knowledge may not be sufficient to describe failure sufficiently. Another example is monitoring care-dependent patients in their homes. It is paramount that the necessity of intervention by care personnel is detected with high accuracy, e.g. if the person fails to get up at the usual time of day or has fallen down. However, it is also important that false alarms are avoided or the monitoring system would not be trusted anymore and may even be switched off. It is therefore important that the monitoring system adapts to the monitored patient and learns what normal behaviour for that person means. For both examples it is easy to see that a single sensor is generally not sufficient. Generally, but not exclusively, a multitude of sensors is required thus creating a multi-dimensional sensor data space. Information from individual sensors may be suitably combined in order to enable decisions to be made about abnormal situations. This will be referred to as "sensor data fusion".

For the examples discussed above and for similar complex scenarios we face the problem of setting up a CMS properly because it is often difficult or impossible to define normal and abnormal conditions in a high-dimensional sensor data space. If an exhaustive number of examples of normal and abnormal situations were available, a supervised learning algorithm could be used to create a classifier set which could be used by the CMS. However, in scenarios such as those considered above, only examples of normal situations may be available and thus normal learning procedure cannot be used.

One of the main problems in deploying a sensor based CMS is to establish normal and abnormal conditions for a multitude of sensors monitored by the CMS. If abnormal conditions or failure states are not known or are ill-defined, a CMS requiring such information cannot be used. Embodiments of the present invention address the problems encountered when deploying a CMS under such conditions.

BRIEF SUMMARY

Exemplary embodiments of the invention aim to improve on what is possible with existing CMSs by allowing the automatic establishment of a sensor-based CMS for ill-defined domains using a high-dimensional sensor data space. Specific exemplary embodiments of the invention aim in particular to: (i) provide means to create "normality models" that allow a system to learn normal conditions automatically for any sensor in the absence of any knowledge about abnormal conditions; (ii) detect abnormal situations automatically by comparing current sensor signatures with signatures predicted in the light of normality models; (iii) allow sensors to be organised into a sensor network, whereby sensors can form sensor groups which act as meta-sensors and perform sensor data fusion; (iv) provide an intelligent data analysis module that analyses data from a sensor network, raises alarms based on the detection of abnormal conditions and adapts the normality model based on user feedback.

According to a first aspect of the present invention, there is provided an analysis system for analysing data from a monitoring system for monitoring at least one characteristic of a dynamic system, said monitoring system providing characteristic data in respect of the dynamic system, the dynamic system having at least one known normal state, the analysis system comprising:

first input means for receiving characteristic data from the monitoring system;

second input means for receiving confirmation information from an operator when the dynamic system is in a known normal state;

normality modelling means arranged to derive a normality model in response to received characteristic data and confirmation information, the normality model comprising data indicative of one or more known normal states;

prediction generating means arranged to predict future characteristic data from data in the normality model;

difference function providing means arranged to provide a difference function, said difference function being indicative of an acceptable difference between predicted future characteristic data and received characteristic data; and comparison means arranged to compare predicted future characteristic data with received characteristic data in conjunction with the difference function, and to produce an abnormality signal if the difference between the predicted future characteristic data and the received characteristic data exceeds the difference function.

According to a second aspect of the present invention, there is provided a method of analysing data from a monitoring system monitoring at least one characteristic of a dynamic system and providing characteristic data in respect thereof, the dynamic system having at least one known normal state, the method comprising the steps of:

receiving characteristic data from the monitoring system;

receiving confirmation information from an operator when the dynamic system is in a known normal state;

deriving a normality model in response to received characteristic data and confirmation information, the normality model comprising data indicative of known normal states;

predicting future characteristic data in response to data in the normality model;

providing a difference function, said difference function being indicative of an acceptable difference between predicted future characteristic data and received characteristic data;

comparing predicted future characteristic data with actual received characteristic data in conjunction with the difference function; and producing an abnormality signal if the difference between the predicted future characteristic data and the actual received characteristic data exceeds the difference function.

Systems and methods according to the present invention may be suitable for use in relation to dynamic systems of many types. The dynamic system may be a living thing (human or otherwise) in which case the monitoring system may include any of a variety of medical sensors, for example. Alternatively the dynamic system may be a mechanical system, a manufacturing, power or other industrial plant, a computer system, or (more generally) an environment (monitored by, for example chemical, temperature, weather and other sensors).

Exemplary embodiments of the invention allow the organisation of a multitude of sensors into an effective sensor network. Sensors can form sensor groups that combine data from several sensors by sensor data fusion. For each sensor or sensor group normality models may automatically be built up. A normality model allows the system to learn what normal conditions are for any sensor or group of sensors in the absence of any knowledge about abnormal conditions. By using normality models to predict the data to be observed by a sensor or sensor group and by comparing this prediction with the actually measured data the system can automatically detect abnormal conditions without the need for any confirmed knowledge about abnormal conditions to be received from an operator such as a human expert or an automated expert system.

Exemplary embodiments of the invention provide an "intelligent" data analysis unit that analyses data from a monitoring system such as a sensor network, causes alarms to be raised based on the detection of abnormal conditions, and adapts the normality models based on user feedback relating to normal conditions. If some knowledge about abnormal conditions is also available, this can also be used to improve the detection accuracy based on the predictions from the normality models, but systems according to embodiments of the present invention are capable of functioning independently of, and thus in the absence of, any data from an operator relating to abnormal conditions.

Exemplary embodiments of the invention allow for the provision of an Intelligent Data Analysis unit (IDA unit) that manages a sensor network and constantly analyses sensor data in order to detect abnormal conditions in the sensor data automatically. The unit contains a mechanism to automatically learn what normal sensor conditions are. The unit maintains a list of sensors that submit data to the unit by suitable communication means (e.g. radio, internet (IP) network, or direct connection). The unit can organise sensors into logical sensor groups. A sensor group acts as a meta-sensor and can be monitored independently from other sensors and sensor groups. A sensor group contains at least one sensor. Any sensor of the sensor network can be a member in any number of sensor groups. Sensors of the sensor network send data to the unit, and depending on their complexity sensors may also receive data from and send data to other sensors within the network.

The unit may interact with a Graphic User Interface (GUI) that allows users to configure the sensors and sensor groups of the sensor network manually. The GUI may also display the results of the data analysis performed on the sensor data. The unit collects data from each sensor and sensor group and runs intelligent data analysis programs on the data. The unit may also use data fusion algorithms to combine sensor data if the data analysis programs require this.

The unit can automatically learn which conditions describe normal data for any sensor in the sensor network. The unit does this by collecting signatures from sensors and uses this data to build a normality model that can be used to predict future signatures. This model can, for example, be built using neural network or neuro-fuzzy learning algorithms. Such learning algorithms may, for example, be used to build a normality model by taking the last n signatures $(S_{t-n+1}, S_{t-n+2} \ldots, S_{t-1}, S_t)$ of the sensor at times t, and then predict the next signature $S_{t+1}$. It then uses the difference between the predicted signature $S'_{t+1}$ and the actual signature $S_{t+1}$ to refine the normality model.

If it is known that there will be an initial period of time during which the dynamic system will be limited to existing in normal conditions, such a period may be used as a "learning phase". During this period the sensor system for which the model is being created will measure only normal data, and the normality model will accurately reflect the normal conditions under which the system operates. After the initial learning phase is over, the unit can then monitor the sensor data and compare new signatures against the predictions obtained from the model during actual monitoring.

According to exemplary embodiments of the invention, however, it is not necessary for there to be a strictly separate "learning phase". Provided that some confirmation information relating to normal conditions may be received from an operator during actual monitoring of the dynamic system, such embodiments are capable of deriving and updating their normality models and/or difference functions as appropriate on the basis of data received from a monitoring system during actual monitoring of the dynamic system.

If the difference between the incoming signature and the predicted signature exceeds an "acceptable" difference level, the incoming signature is considered to indicate an abnormal situation and the unit raises an alarm. The "acceptable" difference level is determined according to a difference function which may be a simple error threshold or Euclidean distance, or may be a more complex function. The difference function may be predetermined, but according to preferred embodiments of the invention, the difference function itself may be updated on the basis of information received from an operator such as a human expert or an automated expert system. As with the updating and refining of the normality model, this may be achieved without the need for the operator to provide any information relating to abnormal conditions, but if such information is available it may also be used in the updating of the difference function, in order to lower the incidence of "false alarms" for example.

The unit can be deployed together with a sensor network in condition monitoring scenarios where boundary conditions are not known or are ill-defined. For each sensor and sensor group the unit will automatically learn what normal conditions are and will conclude that a boundary condition has been reached if the current incoming signature is not sufficiently similar to the expected and predicted signature.

Systems according to some embodiments of the present invention may be used to analyse continuously-changing data. Such data may be provided by sensors of physical characteristics such as temperature, pressure, chemical concentration etc. Alternatively, systems according to other embodiments of the present invention may be used to analyse discrete data relating to the occurrence of separate events, for example. Such data may be provided by the sensors of a domestic alarm system or a patient monitoring system, for example. In such embodiments, the characteristic data may relate to discrete states or events such as the opening or closing of doors and windows, the presence or absence of individuals in rooms, the switching on and off of lights and other appliances, and other such events. In systems such as these, normality models may be derived relating to sequences confirmed by an operator to be normal, and these may be used to predict the occurrence of future states or sequences of events on the basis of data received. If actual received data indicates significantly different states or sequences to those predicted on the basis of the normality model, or if an event predicted to happen at a particular time actually takes place at a time that is not within an acceptable time difference, an alarm should be raised in a manner corresponding to that with a system analysing continuously-changing data.

Thus, according to a third aspect of the present invention, there is provided an analysis system for analysing data from a monitoring system for monitoring at least one characteristic of a dynamic system, said monitoring system providing characteristic data in respect of the dynamic system, the dynamic system having at least one known normal sequence of states, the analysis system comprising:

first input means for receiving characteristic data from the monitoring system;

second input means for receiving confirmation information from an operator when the dynamic system proceeds according to a known normal sequence of states;

normality modelling means arranged to derive a normality model in response to received characteristic data and confirmation information, the normality model comprising data indicative of one or more known normal sequences of states;

prediction generating means arranged to predict future characteristic data from data in the normality model;

difference function providing means arranged to provide a difference function, said difference function being indicative of an acceptable difference between predicted future characteristic data and received characteristic data; and comparison means arranged to compare predicted future characteristic data with received characteristic data in conjunction with the difference function, and to produce an abnormality signal if the difference between the predicted future characteristic data and the received characteristic data exceeds the difference function.

Further, according to a fourth aspect, there is provided a method of analysing data from a monitoring system monitoring at least one characteristic of a dynamic system and providing characteristic data in respect thereof, the dynamic system having at least one known normal sequence of states, the method comprising the steps of:

receiving characteristic data from the monitoring system;

receiving confirmation information from an operator when the dynamic system proceeds according to a known normal sequence of states;

deriving a normality model in response to received characteristic data and confirmation information, the normality model comprising data indicative of known normal sequences of states;

predicting future characteristic data in response to data in the normality model;

providing a difference function, said difference function being indicative of an acceptable difference between predicted future characteristic data and received characteristic data;

comparing predicted future characteristic data with actual received characteristic data in conjunction with the difference function; and producing an abnormality signal if the difference between the predicted future characteristic data and the actual received characteristic data exceeds the difference function.

It will be noted that systems according to the first and third aspects, and methods according to the second and fourth aspects, may overlap. Further embodiments may thus comprise systems or methods combining the two respective aspects.

IDA units according to exemplary embodiments of the present invention are thus capable of using user feedback related purely to normal conditions to retrain the normality model.

This may be necessary, if an alarm is being raised although the user considers the situation to be normal. The IDA unit may also use examples to learn specific alarm situations, if the operator can provide this information. The IDA unit can also use prior knowledge of the user to support and shorten the learning phase. The user can provide fuzzy rules describing normal and/or abnormal situations and the IDA unit may then use neuro-fuzzy learning algorithms to learn additional rules and/or refine the existing rules for each sensor.

BRIEF DESCRIPTION OF THE DRAWINGS

Embodiments of the invention will now be described with reference to the accompanying Figures in which.

DETAILED DESCRIPTION OF EXEMPLARY EMBODIMENTS

Figure 1:
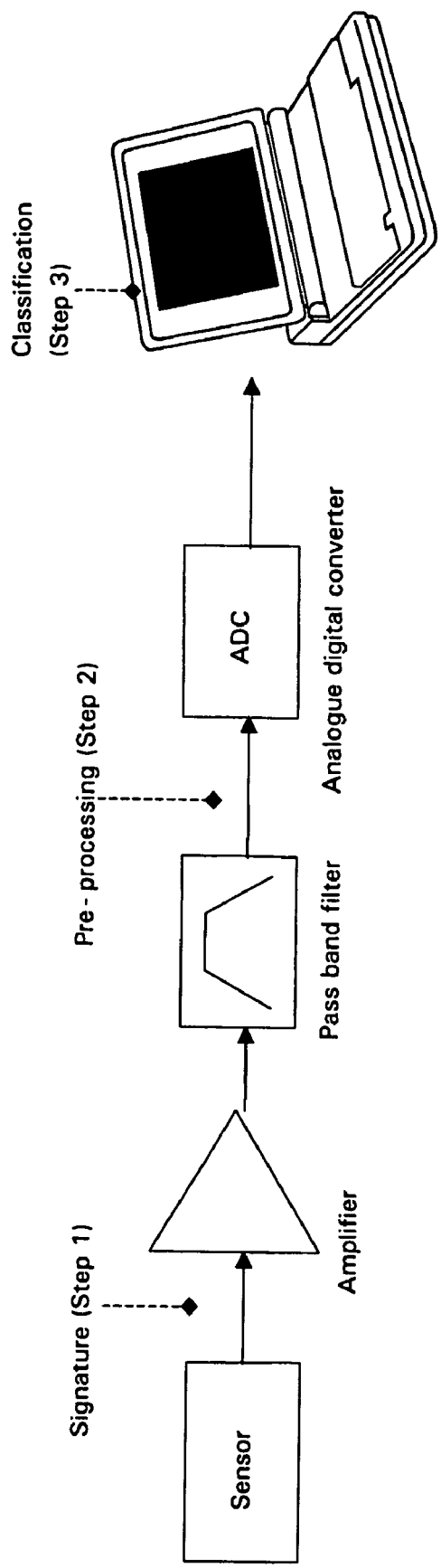
FIGS. 1 to 4 illustrate the manner in which sensor signatures may be used according to a condition monitoring process.
Figure 2:
Figure 3:
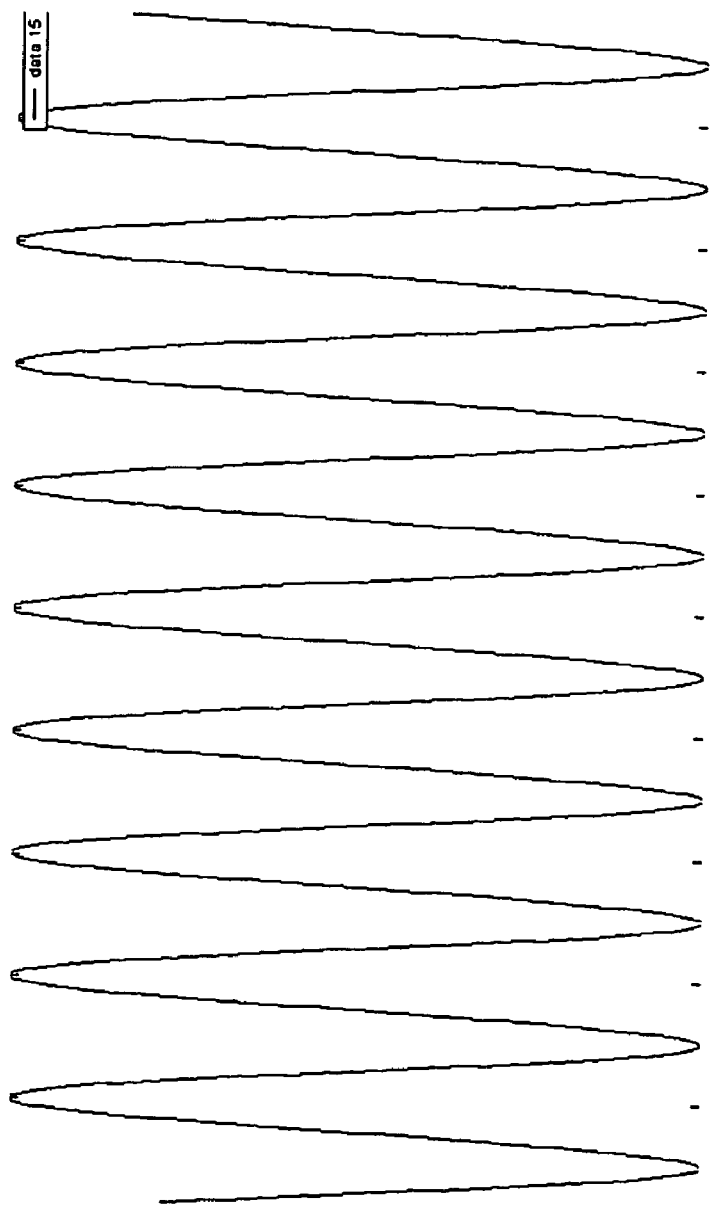
Figure 4:
Figure 5:
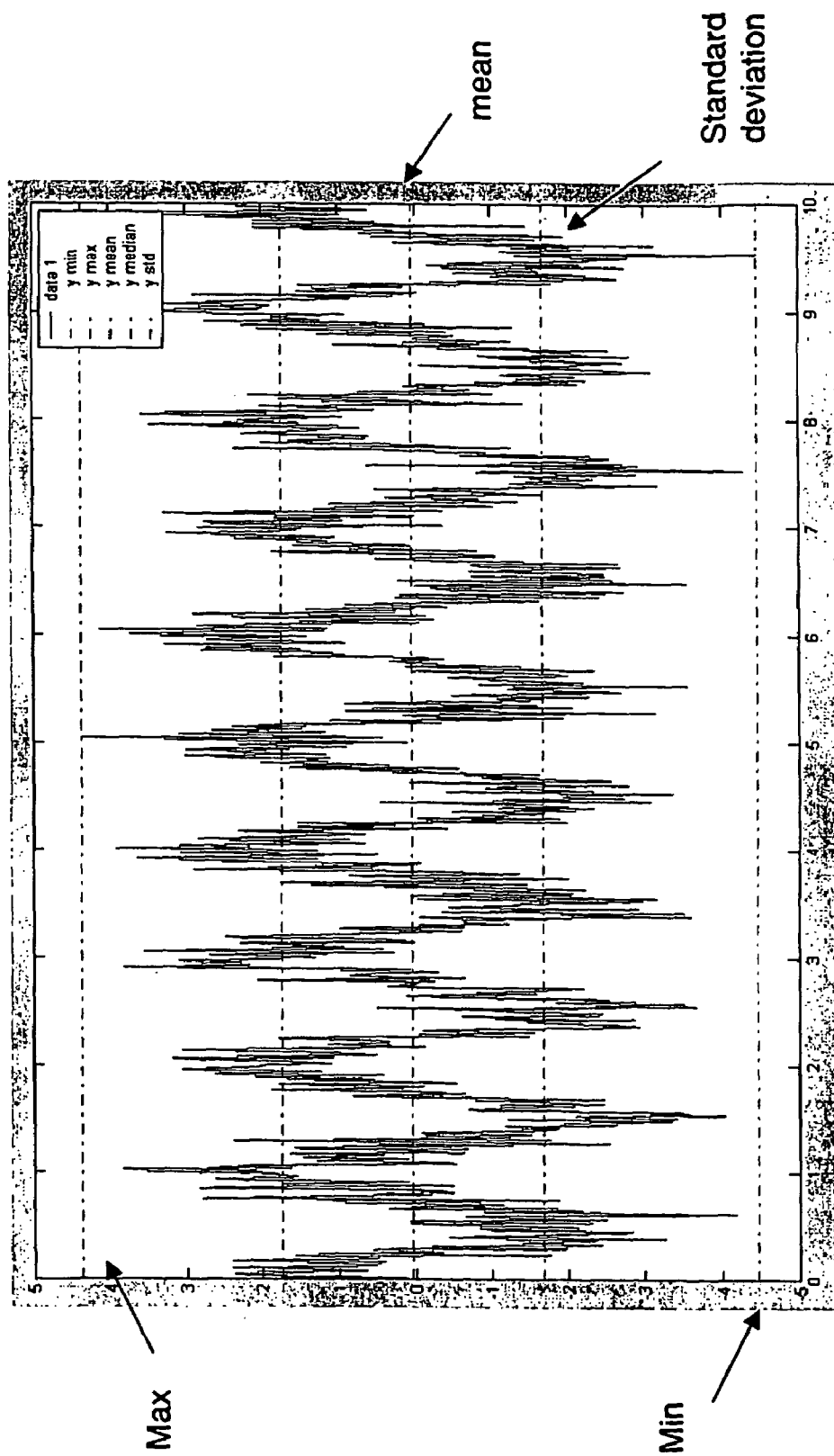
FIG. 5 is a graphical illustration of types of thresholds which may be used during condition monitoring.
Figure 6:
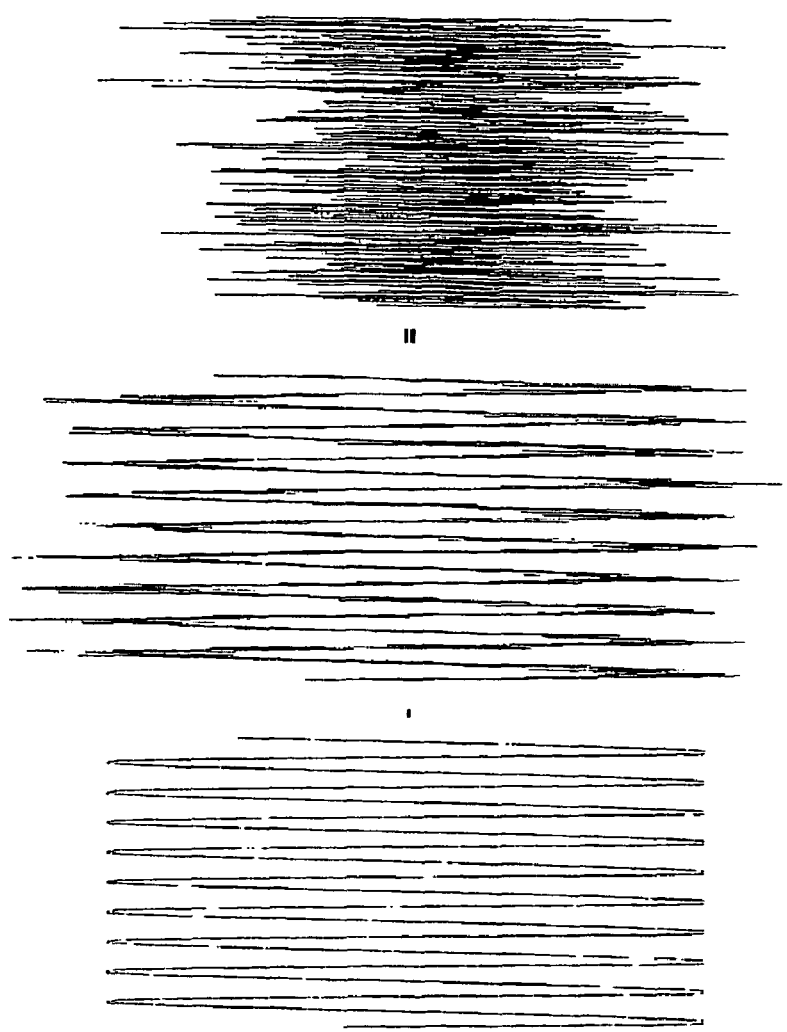
FIG. 6 is a graphical illustration of the subtraction of an incoming signature from a reference signature.
Figure 7:
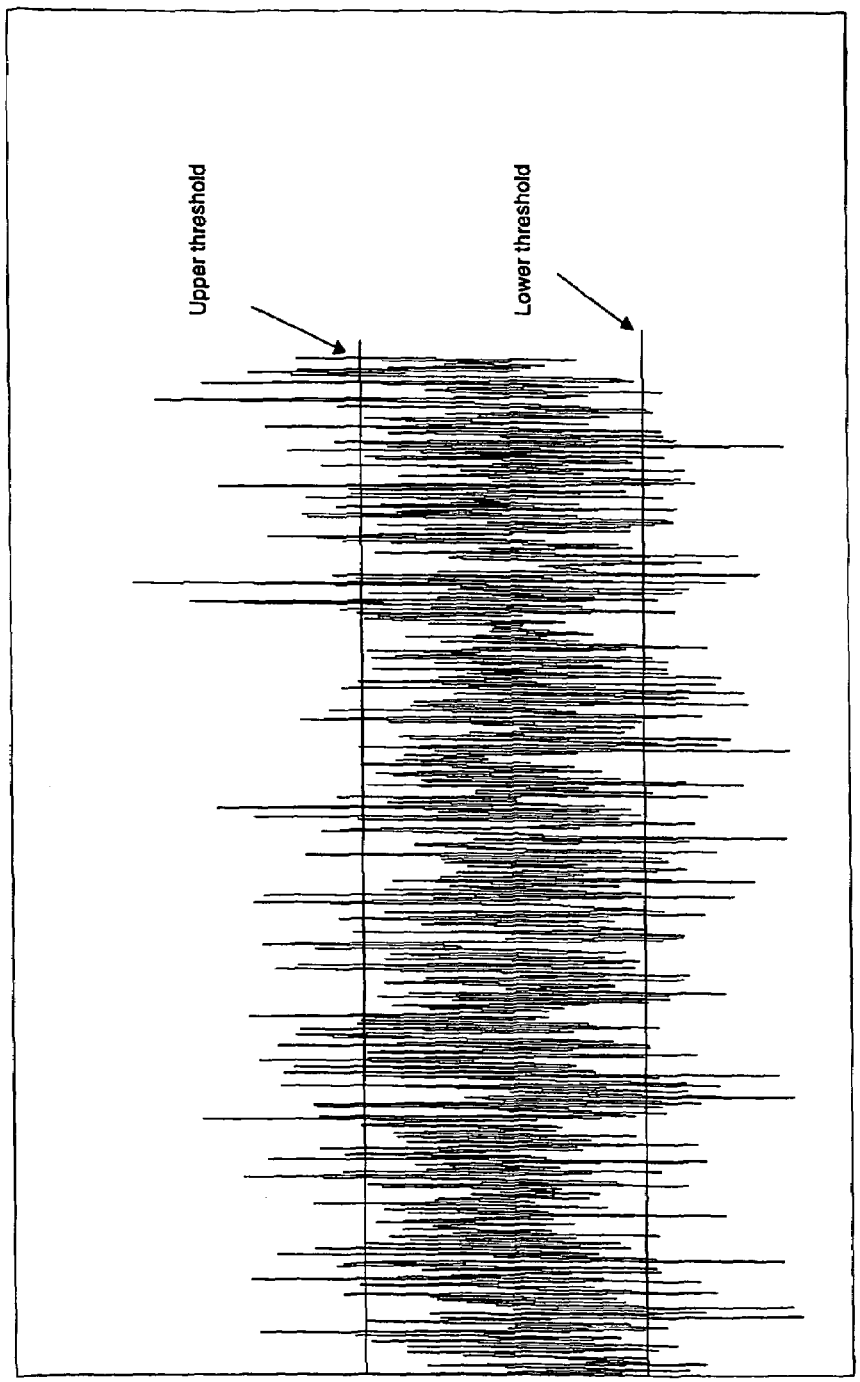
FIG. 7 is a graph illustrating the choice of thresholds for error signals.
Figure 8:
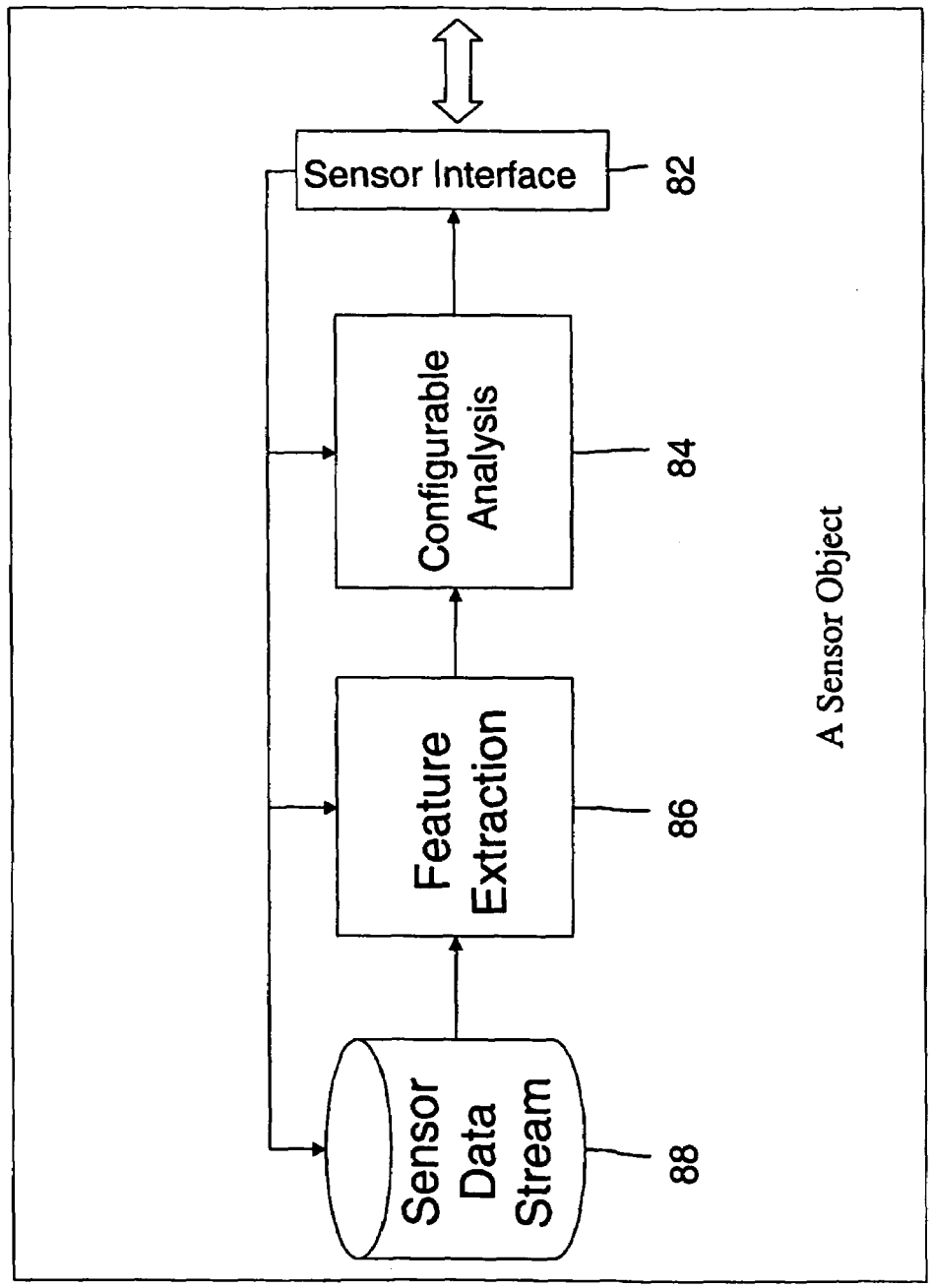
FIG. 8 is a block diagram of a sensor object.
Figure 9:
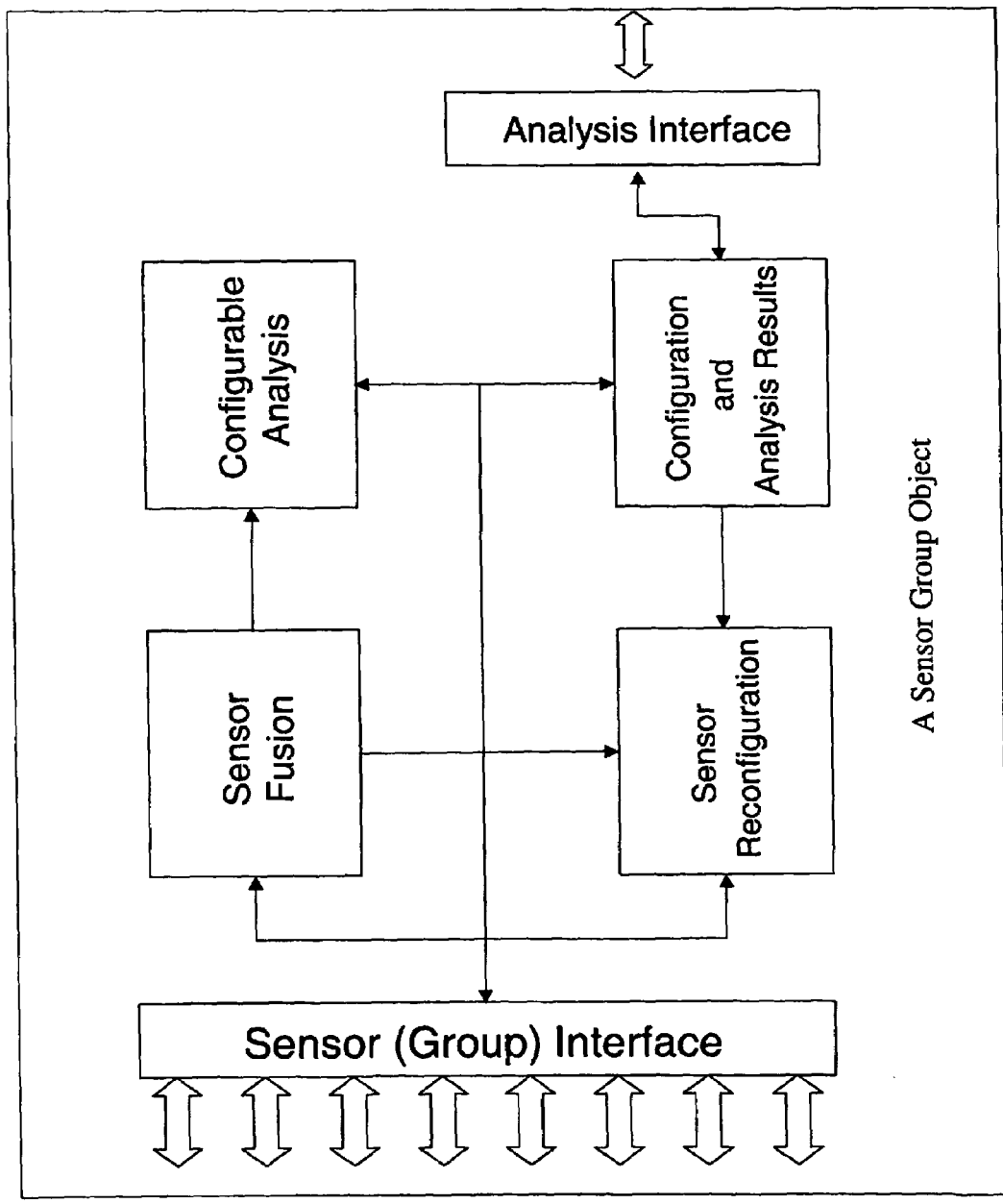
FIG. 9 is a block diagram of a sensor group object.
Figure 10:
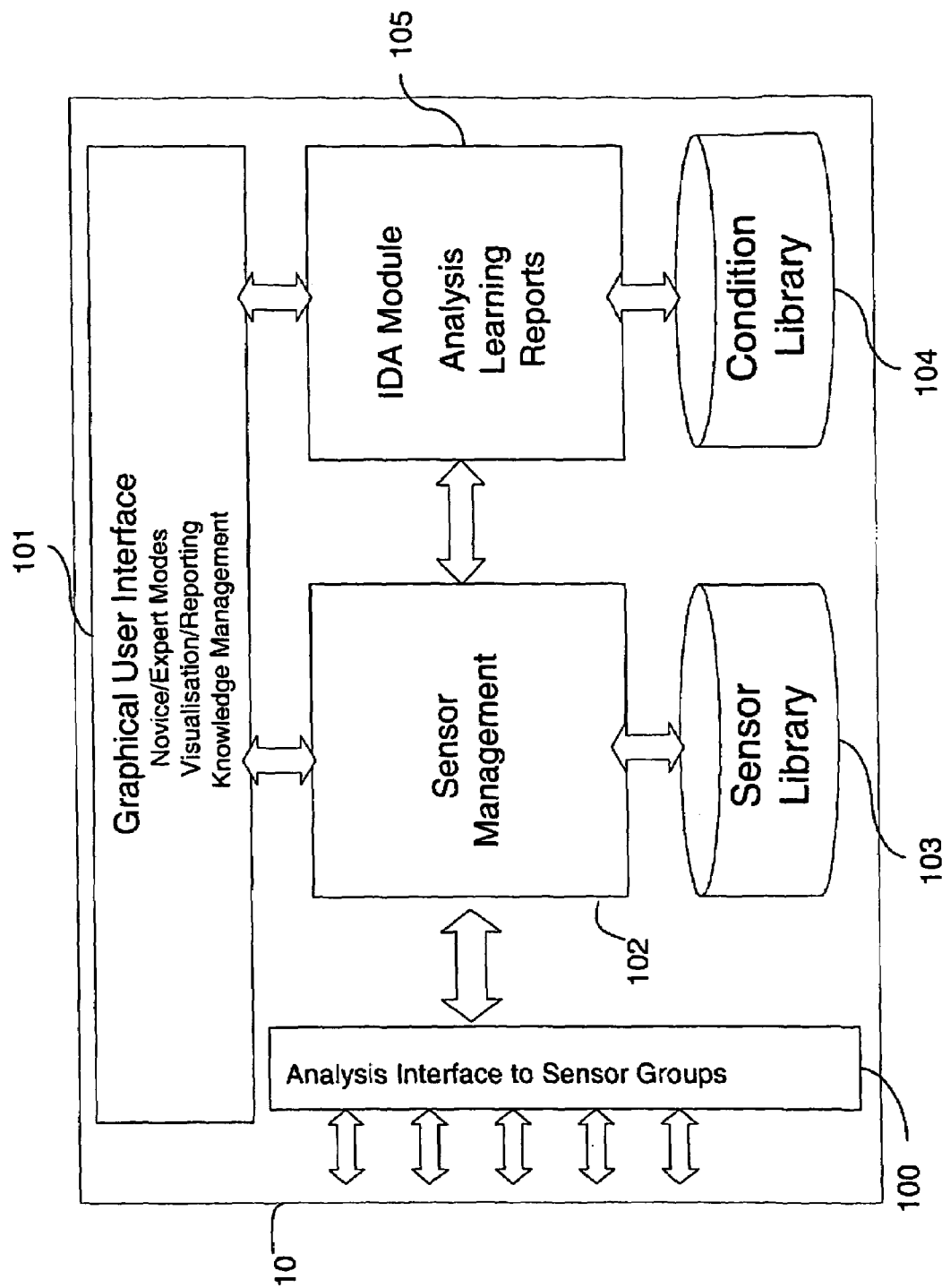
FIG. 10 is a diagram of a data analysis unit according to an embodiment of the present invention.

With reference to FIGS. 8 to 10, an Intelligent Data Analysis (IDA) unit 10 for a sensor network is shown. This unit is responsible for collecting, managing and analysing data from a hierarchically structured network of sensors. The IDA unit 10 allows users to add sensors to or remove them from the network, organise them into groups, configure them and analyse the data they produce. The IDA unit 10 allows for automatic data analysis by learning normal/abnormal patterns in sensor data. On detection of abnormal patterns an alarm is raised automatically. The user can configure the learning and analysis features of the unit by specifying rules for individual sensors. The unit also provides analysis of historic sensor data and generates reports on demand.

Functions of the IDA unit 10 may include:
Providing an output to a GUI that allows users to configure and analyse sensor data;
Managing a sensor network by organising sensors into sensor groups;
Accessing and intelligent pre-processing of sensor data;
Continuous automatic analysis of sensor data;
Raising alarms depending on analysis results and conditions specified about sensor data;
Learning normal/abnormal patterns in sensor data and predicting alarms; and
Reporting

Sensors and Sensor Groups

A sensor is an entity that either constantly submits data to the system or provides data on demand. The data transport is not part of the functionality of the IDA unit. The IDA unit accesses streams that provide sensor data. A Logical Sensor Pool layer provides access to those streams via a suitable protocol (HTTP, RMI, etc).

Referring to FIGS. 8 and 9, sensors may act individually or be organised into sensor groups. Each sensor can be a member of any number of sensor groups. A sensor group may contain both sensors and sensor groups such that a directed acyclic graph is formed. This hierarchically structured sensor tree resembles a directory tree of a file system. Sensors may be regarded as the leaf nodes of a sensor tree, while sensor groups are inner nodes and cannot be leaf nodes (i.e. from each sensor group node there is a path to a sensor node). Even if a sensor or sensor group appears as a member in several other sensor groups it may only exist once in the system. Nodes are simply references to sensors or sensor groups. If there is no reference left to a sensor or sensor group, the corresponding object may be removed from the system.

FIG. 8 shows the main properties of a sensor object. The sensor provides a data stream 88 that can be switched on or off via the sensor interface 82. The sensor object provides means for feature extraction 86 and data analysis 84. The main function of such internal data analysis is complexity reduction in order to reduce the impact on the main data analysis modules. It can be used to compute summaries of the data or to supervise the data stream and raise alarms. Depending on the features of the corresponding sensor hardware, parts of the feature extraction and analysis may take place in the actual sensor. If the sensor hardware only provides a data stream, the IDA unit 10 (see FIG. 10) may provide the necessary feature extraction and analysis.

A sensor group (see FIG. 9) allows the formation of logical sensors with more than one data channel. Users can specify rules that are applicable to all members of a sensor group. A sensor group can fuse and analyse the (already pre-processed) data provided by its members. Based on analysis results it can re-configure its members. A sensor group provides access to its configuration and analysis results via an Analysis Interface.

IDA and GUI

The IDA unit 10 provides management and analysis functionality and output to a graphical user interface 101. It contains an interface 100 with the sensors and/or sensor groups of the monitoring system and a module 102 for sensor management that has access to a sensor library 103. The user can add and configure sensors to the sensor tree via the sensor management module 102. If a sensor is part of the sensor library 103 the sensor can be pre-configured thereby reducing the amount of work the user has to do to set up the sensor.

An IDA module 105 of the unit is responsible for the analysis of all sensor and sensor group data. Depending on the amount of data analysis already carried out by sensors and sensor groups the IDA module 105 handles everything from low level sensor data and signatures up to computed statistical summaries of the actual data. In the following the term sensor information will be used to refer to data and analysis results provided by sensors and sensor groups.

The IDA module 105 provides a number of analysis methods, which can be applied to sensor information. It also provides access to the analysis methods provided by sensors and sensor groups. The IDA module contains several learning methods in order to recognise normal and abnormal sensor information automatically which are explained in more detail below. The IDA module 105 has access to a condition library 104 from which it can retrieve rules that are applicable to certain types of known sensors.

Figure 11:
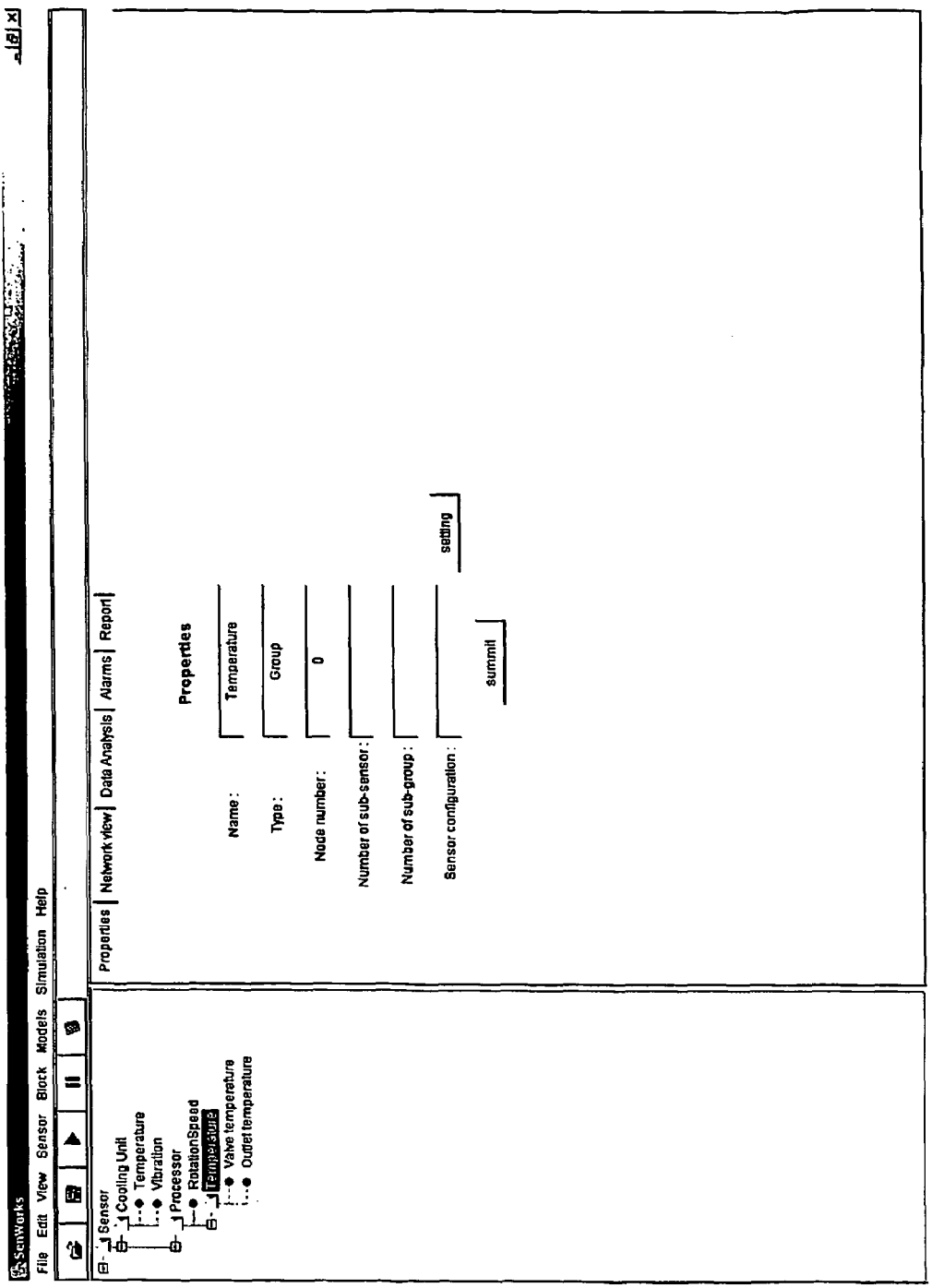
FIG. 11 is an example of the graphical user interface (GUI) of a data analysis unit according to an embodiment of the present invention, showing sensor properties.
Figure 12:
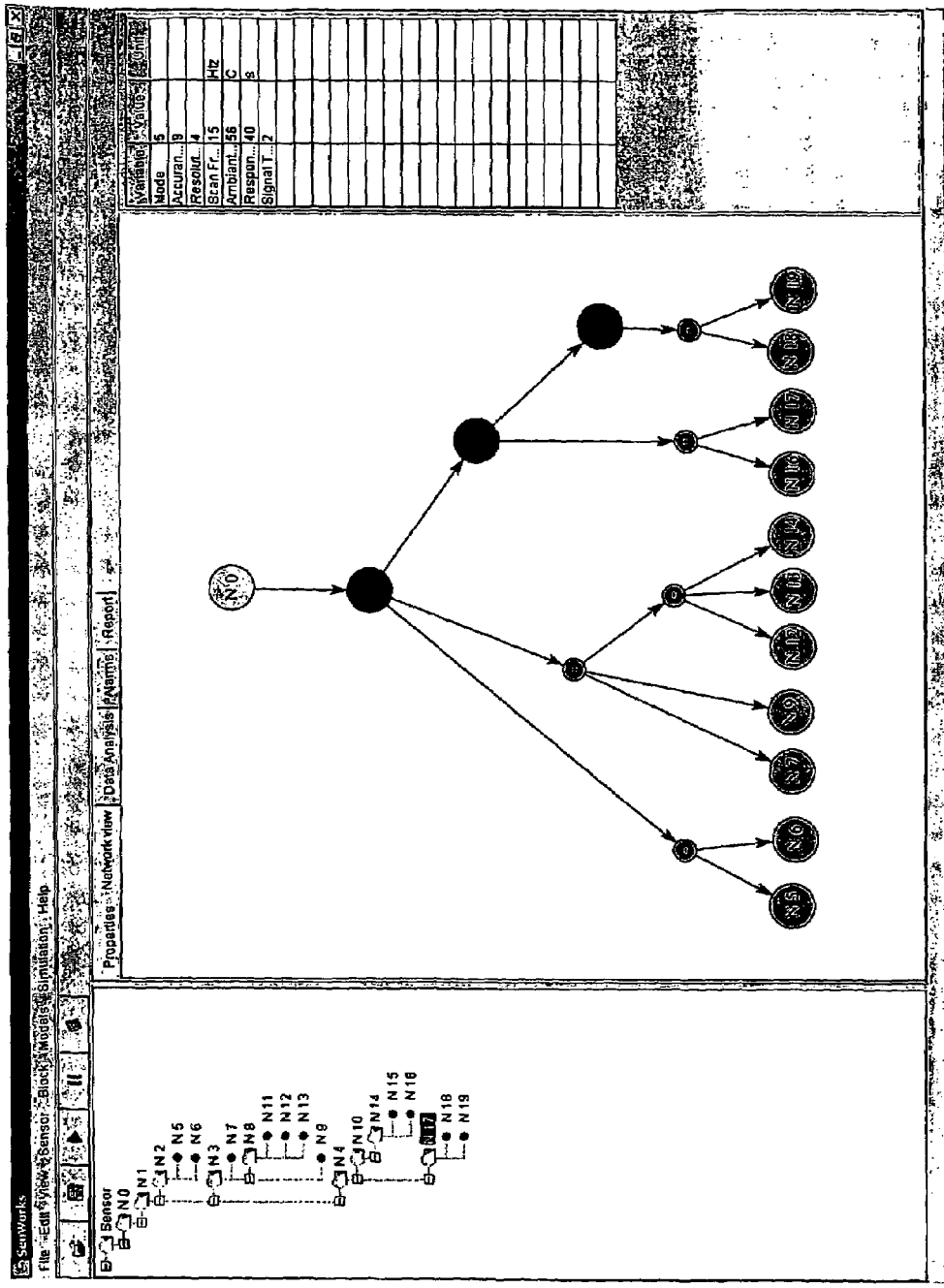
FIG. 12 is an example of the graphical user interface (GUI) of a data analysis unit according to an embodiment of the present invention, showing a sensor network.

The GUI 101 provides the access to all functions of the system. It allows the user to add, remove and configure sensors and sensor groups and it displays the sensor tree (see FIGS. 11 and 12). By navigating to the sensor tree, the user can access each object, configure it and retrieve information about it.

Normality Models

Figure 13:
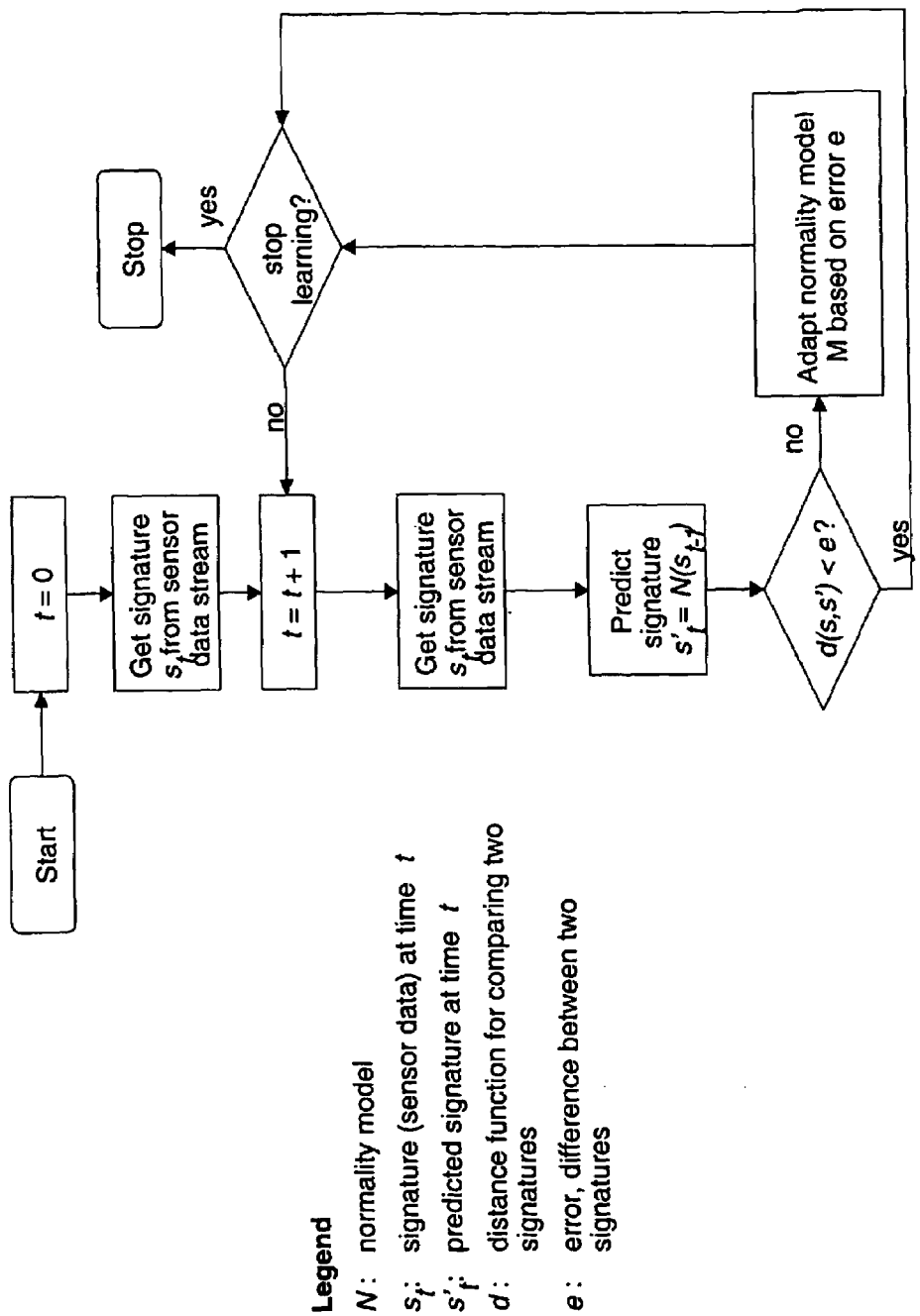
FIG. 13 is a flow chart demonstrating the building of a normality model for data analysis according to the present invention.

With reference to FIGS. 10 and 13, the IDA module 105 of the IDA unit 10 uses normality models to detect abnormal conditions in sensor signatures. From the normality model, a prediction $s'_{t+1}$ of the signature at time t+1 is generated based on the signature $S_t$ and possibly earlier signatures from the last n time steps. The IDA module 105 then compares $s'_{t+1}$ with the actually measured $s_{t+1}$. If the difference (error) exceeds a certain amount, the unit produces a signal causing an alarm to be raised.

FIG. 13 illustrates the process of building a normality model in the event that a "learning phase" is able to be used. For this to be the case, it must be known that there will be an initial period during which it is known that the dynamic system will be limited to existing in normal conditions The building of the normality model can be based on any machine learning approach, like, for example, neural networks, neuro-fuzzy systems, regression trees etc. The normality model predicts the next signature based on the last n measured signatures. In FIG. 13, n=1 is selected. A signature is represented as a vector of real numbers. An evaluation means is used to compute the error between the predicted and the actual next signatures. For a multi-dimensional vector, the error may be calculated from the Euclidean distance, or more complex functions may be used. This error is then fed back to the normality model and is used to train the model such that the next prediction will be more accurate. For normality models based on neural networks, for example, learning algorithms like back-propagation or resilient propagation are used. If the model is based on a neuro-fuzzy system, learning algorithms based on a neuro-fuzzy function approximation (NEFPROX) may be used. These learning algorithms can operate online; i.e. they can collect training data during training. If the learning algorithms cannot operate online, the IDA collects a suitable number of signatures to form a training set and then trains the normality model. This approach could be used for regression trees, for example, because the induction algorithm for regression trees runs in an offline mode and expects all training data to be available before learning starts.

After a normality model has been trained and can successfully predict the next sensor signature from the previous n signatures it can be used for detecting abnormal conditions. The flow chart of FIG. 14 demonstrates the analysis of data and detection of abnormal conditions using normality models according to a preferred embodiment of the present invention. Referring first to the principal steps of the flow chart, successive signatures $s_t$ indicative of characteristic data are received from a monitoring system at steps 141 and 141'. At step 144, a prediction $s'_t$ is made from the data in the normality model prior to the receipt of the most recent signature. It will be noted that the predicting step 144 may be carried out before or after the most recent signature receiving step 141'. At step 145 a function d(s,s') indicative of the distance between the most recent actual received signature and the predicted signature is compared with a difference function θ. The form of the difference function θ will be discussed in more detail below. If the distance d(s,s') is greater than the difference function θ, the present condition is deemed to be abnormal, and the system causes an alarm to be raised (step 146). The severity of the alarm may depend on the size of the deviation and can also depend on the number of deviations over a certain time interval. On receipt of this alarm, an operator who recognises the alarm to be false because the present condition is normal may provide a confirmation signal to the system that the present condition is in fact normal (step 147), in which case it is concluded that the normality model needs to be updated (step 148). If no such confirmation signal is received from an operator in response to an alarm, it is concluded that the alarm was correctly indicative of an abnormal situation.

While the above paragraph describes an embodiment in which the normality model may be updated on an ongoing basis in response to received signatures and confirmation information, it will be noted that according to certain embodiments of the invention, ongoing adjustment of the system may instead be achieved by updating the form of the difference function θ. In its simplest form, the difference function θ may be a simple error threshold or Euclidean distance, but it may be a more complex function, dependent on factors such as previously received data, time-related factors, number of alarms previously raised etc. The difference function may be updated on the basis of information received from an operator such as a human expert or an automated expert system, and according to preferred embodiments may be a determined according to a fuzzy logic rule-base.

It will be evident that while the effects of updating the normality model and updating the difference function may complement each other, and that embodiments in which both may be updated are preferred on the grounds that they are most adaptable, embodiments in which one and not the other may be updated, and embodiments in which neither may be updated, will be sufficient for certain applications.

Figure 14:
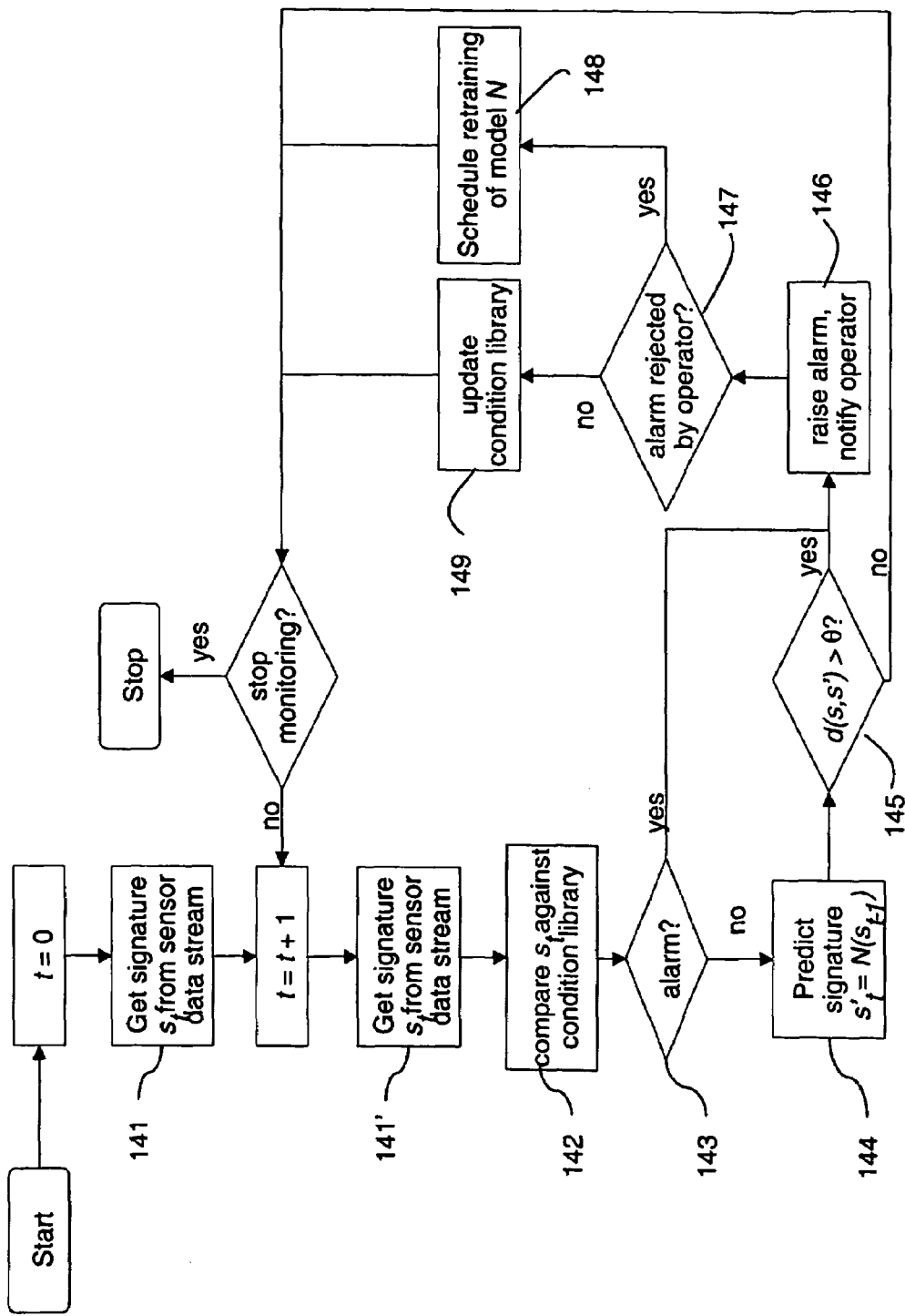
FIG. 14 is a flow chart demonstrating the detection of abnormal conditions using normality models during data analysis according to the present invention.

The detection of abnormal conditions can also depend on an optional condition library that is consulted before or after the steps of predicting and comparing signatures with the normality model. If previous abnormal conditions are known and have been stored, the current signature can be compared against those conditions and an alarm can be raised if the current signature matches one of the stored conditions. If the operator accepts the alarm, the condition library can be updated. Thus abnormal conditions can be collected over time and used to complement the normality model. Steps 142, 143 and 149 in the flow-chart of FIG. 14 shows the use of such a condition library to detect known abnormal conditions. Received signatures are compared with signatures stored in the condition library in step 142, shown prior to steps of signature prediction (144) and comparison (145) of the distance d(s,s') between the actual received signature and the predicted signature with the difference function θ, but it will be noted that steps 142 and 143 could be performed after steps 144 and 145. An alarm is raised at step 143 if the most recent detected signature is a sufficiently close match to one of those stored in the condition library as a known abnormal signature. Updating of the condition library (step 149) is carried out in the event that an alarm raised by the system at step 143 is accepted by the operator at step 146—this is taken as confirmation that a condition "believed" to be abnormal by the system is also diagnosed as abnormal by the operator. Such updating may be done in addition to updating of the normality model and/or updating of the difference function.

Figure 15:
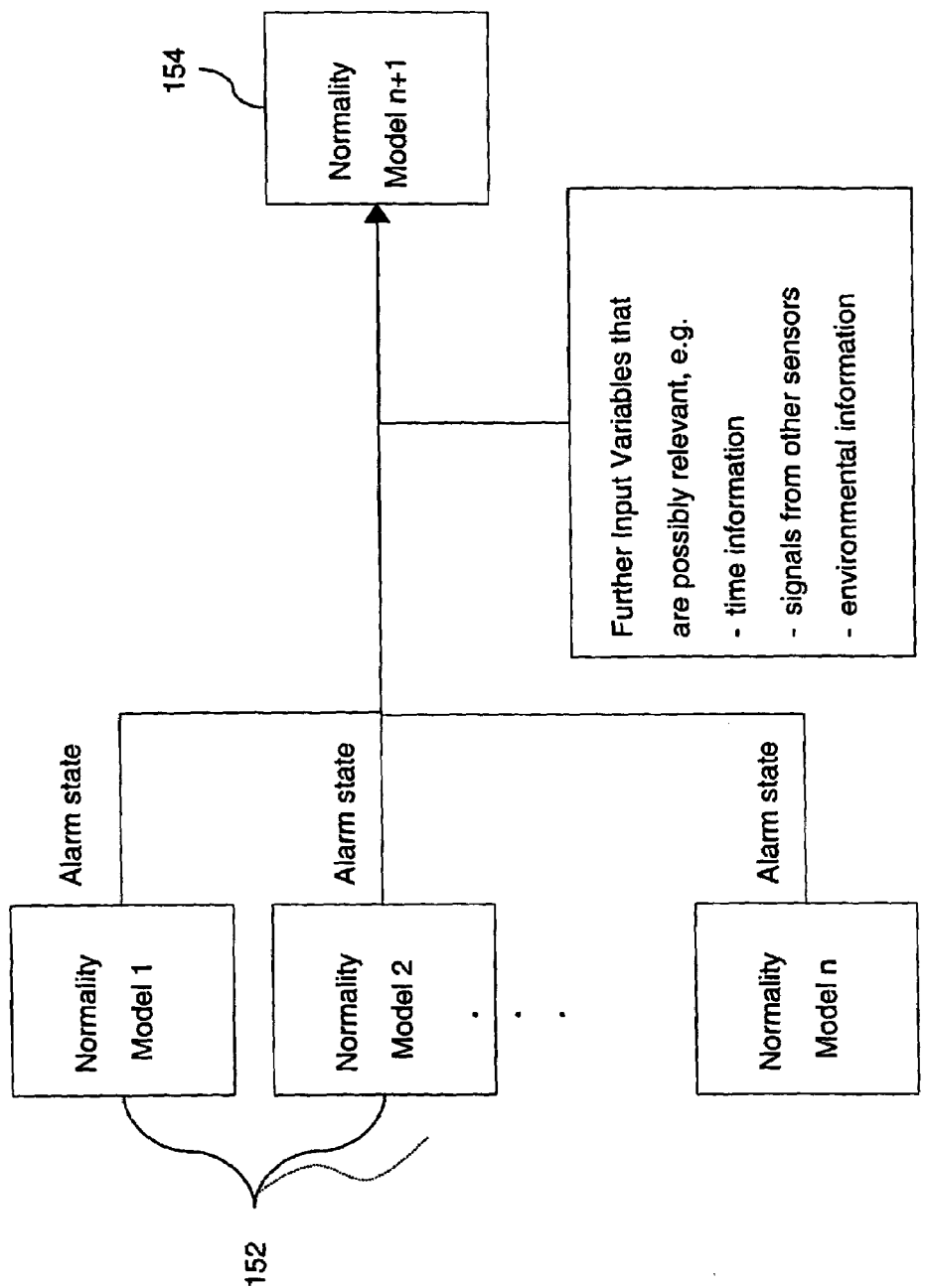
FIG. 15 illustrates how a normality model of normality models may be formed.

Normality models may be used in respect of individual sensors or sensor groups, as well as in respect of a complete network of sensors. With reference to FIG. 15, if data is being received from a system in respect of which characteristics monitored by some sensors or groups of sensors may be analysed independently of others, it may be appropriate to form a hierarchy of normality models. First stage normality models 152 created in relation to separate sensors or sensor groups each provide an output equivalent to an alarm state or a sensor signal, and the analysis system may treat these outputs as characteristic data and use these for deriving a "normality model of normality models" 154 for analysing data according to the invention.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. An analysis system for analyzing data from a monitoring system for monitoring at least one characteristic of a dynamic system, said monitoring system providing characteristic data in respect of the dynamic system, the dynamic system having at least one known normal state, the analysis system comprising:

first input means for receiving characteristic data from the monitoring system indicative of a state of the dynamic system;

second input means for receiving confirmation information from an operator in an event that said operator considers the dynamic system to be in a known normal state, said confirmation information being associated with said characteristic data, and said confirmation information indicating that said operator considers the dynamic system to be in a known normal state;

normality modelling means arranged to derive a normality model in response to received characteristic data and confirmation information, the normality model comprising data indicative of one or more known normal states;

prediction generating means arranged to predict future characteristic data from data in the normality model;

difference function providing means arranged to provide a difference function, said difference function being indicative of an acceptable difference between predicted future characteristic data and received characteristic data; and comparison means arranged to compare predicted future characteristic data with received characteristic data in conjunction with the difference function, and to produce an abnormality signal if the difference between the predicted future characteristic data and the received characteristic data exceeds the difference function.

2. An analysis system for analyzing data from a monitoring system for monitoring at least one characteristic of a dynamic system, said monitoring system providing characteristic data in respect of the dynamic system, the dynamic system having at least one known normal sequence of states, the analysis system comprising:

first input means for receiving characteristic data from the monitoring system indicative of a state of the dynamic system;

second input means for receiving confirmation information from an operator in an event that said operator considers the dynamic system to be in a known normal state, said confirmation information being associated with said characteristic data, and said confirmation information indicating that said operator considers the dynamic system proceeds according to a known normal sequence of states;

normality modelling means arranged to derive a normality model in response to received characteristic data and confirmation information, the normality model comprising data indicative of one or more known normal sequences of states;

prediction generating means arranged to predict future characteristic data from data in the normality model;

difference function providing means arranged to provide a difference function, said difference function being indicative of an acceptable difference between predicted future characteristic data and received characteristic data; and comparison means arranged to compare predicted future characteristic data with received characteristic data in conjunction with the difference function, and to produce an abnormality signal if the difference between the predicted future characteristic data and the received characteristic data exceeds the difference function.

3. An analysis system according to claim 1, wherein the difference function providing means provides a predetermined difference function.

4. An analysis system according to claim 1, wherein the difference function providing means comprises difference function deriving means for deriving a difference function from received characteristic data and presence or absence of confirmation information.

5. An analysis system according to claim 1, wherein the difference function providing means comprises difference function updating means for updating the difference function if confirmation information that the dynamic system is in a normal state is received from an operator in response to an abnormality signal.

6. An analysis system according to claim 1, wherein the difference function providing means uses fuzzy logic.

7. An analysis system according to claim 1, wherein the normality modelling means comprises normality model updating means for updating the normality model in response to received characteristic data and the presence or absence of confirmation information from an operator.

8. An analysis system according to claim 1, wherein the normality model is a fuzzy system.

9. An analysis system according to claim 1, further comprising:

abnormality state storage means for storing data indicative of one or more known abnormal states; and abnormality comparison means for comparing received characteristic data with data in the abnormality state storage means, and producing an abnormality signal if the received characteristic data matches the data in the abnormality state storage means.

10. A method of analyzing data from a monitoring system monitoring at least one characteristic of a dynamic system and providing characteristic data in respect thereof, the dynamic system having at least one known normal state, the method comprising the steps of:

receiving characteristic data from the monitoring system indicative of a state of the dynamic system;

receiving confirmation information from an operator in an event that said operator considers the dynamic system to be in a known normal state, said confirmation information being associated with said characteristic data, and said confirmation information indicating that said operator considers the dynamic system to be in a known normal state;

deriving a normality model in response to received characteristic data and confirmation information, the normality model comprising data indicative of known normal states;

predicting future characteristic data in response to data in the normality model;

providing a difference function, said difference function being indicative of an acceptable difference between predicted future characteristic data and received characteristic data;

comparing predicted future characteristic data with actual received characteristic data in conjunction with the difference function; and producing an abnormality signal if the difference between the predicted future characteristic data and the actual received characteristic data exceeds the difference function.

11. A method of analyzing data from a monitoring system monitoring at least one characteristic of a dynamic system and providing characteristic data in respect thereof, the dynamic system having at least one known normal sequence of states, the method comprising the steps of:

receiving characteristic data from the monitoring system indicative of a state of the dynamic system;

receiving confirmation information from an operator in an event that said operator considers the dynamic system to be in a known normal state, said confirmation information being associated with said characteristic data, and said confirmation information indicating that said operator considers the dynamic system proceeds according to a known normal sequence of states;

deriving a normality model in response to received characteristic data and confirmation information, the normality model comprising data indicative of known normal sequences of states;

predicting future characteristic data in response to data in the normality model;

providing a difference function, said difference function being indicative of an acceptable difference between predicted future characteristic data and received characteristic data;

comparing predicted future characteristic data with actual received characteristic data in conjunction with the difference function; and producing an abnormality signal if the difference between the predicted future characteristic data and the actual received characteristic data exceeds the difference function.

* * * * *